United States Patent
Ito et al.

(10) Patent No.: US 6,768,275 B2
(45) Date of Patent: Jul. 27, 2004

(54) DISCHARGE LAMP LIGHTING CIRCUIT

(75) Inventors: Masayasu Ito, Shizuoka (JP); Hitoshi Takeda, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/382,587

(22) Filed: Mar. 7, 2003

(65) Prior Publication Data

US 2003/0222599 A1 Dec. 4, 2003

(30) Foreign Application Priority Data

Mar. 8, 2002 (JP) ..................................... P.2002-063065

(51) Int. Cl.[7] ................................................ G05F 1/00
(52) U.S. Cl. ....................... 315/308; 315/224; 315/219; 315/291; 315/DIG. 7
(58) Field of Search ................................ 315/291, 307, 315/308, 224, 219, 209 R, 289, 82, DIG. 5, DIG. 7

(56) References Cited

U.S. PATENT DOCUMENTS 6,127,788 A * 10/2000 Yamamoto et al. ......... 315/307
6,208,089 B1 * 3/2001 Ito et al. ..................... 315/308
6,597,131 B2 * 7/2003 Ito et al. ..................... 315/308

FOREIGN PATENT DOCUMENTS

JP         9-274995        10/1997

* cited by examiner

Primary Examiner—Haissa Philogene
(74) Attorney, Agent, or Firm—Sughrue Mion, PLLC

(57) ABSTRACT

In a discharge lamp lighting circuit, a DC—DC converting circuit has a switching element to be connected to a transformer and a primary winding thereof, and control is carried out in such a manner that the transformer stores energy while the switching element is set in an ON state in response to a signal sent from a control circuit, the energy is output from a secondary winding of the transformer while the switching element is set in an OFF state, and the switching element is turned ON when the energy is completely output from the secondary winding in a stable lighting state of a discharge lamp. A fluctuation is applied to the control of an output current or power related to the discharge lamp which is carried out for the ON period of the switching element, thereby changing a switching frequency.

7 Claims, 14 Drawing Sheets

DISCHARGE LAMP LIGHTING CIRCUIT

BACKGROUND OF THE INVENTION

1. Field of the Invention

The present invention relates to a discharge lamp lighting circuit, and more particularly to a discharge lamp lighting circuit incorporating noise countermeasures.

2. Description of the Related Art

There is known a structure in which a DC—DC converting circuit, a DC-AC converting circuit and a starting circuit are provided in the lighting circuit of a discharge lamp, such as a metal halide lamp.

In order to suppress the influence of a noise generated by the DC—DC converting circuit, there is a method of causing a switching frequency to have a fluctuation. By changing the noise into a white noise that can be dispersed, it is possible to reduce an influence on an apparatus for receiving an electric wave, such as a radio wave.

For example, in the case in which PWM (pulse width modulation) control is to be carried out in the DC—DC converting circuit, a fluctuation having a certain width is given to a switching frequency and is defined to be a predetermined frequency so that the generation of a beat noise can be prevented. In other words, in the case in which the switching frequency has a fixed value, a noise is generated at a harmonic frequency.

FIGS. 14 and 15(a) and 15(b) are diagrams for explaining the application of a fluctuation related to a switching frequency, FIG. 14 being a diagram showing the main part of a control circuit (a sawtooth wave generating section) and FIGS. 15(a) and 15(b) being schematic waveform diagrams.

In this case, the PWM control is supposed for the switching control of the DC—DC converting circuit, and a resistor b and a capacitor c are connected to a terminal "RT/CT" of a sawtooth wave generating circuit as shown in FIG. 14. The terminal "RT/CT" is provided for determining the frequency of a sawtooth wave and is connected to a node of the resistor b and the capacitor c. More specifically, one of the ends of a constant voltage source representing a reference voltage "Vref" is connected to one of the ends of the resistor b and the other end of the resistor b is connected to the terminal "RT/CT" and is grounded through the capacitor c.

In order to change the switching frequency, it is preferable that the resistance value of the resistor b to be connected to the terminal "RT/CT" should be changed (the resistor b is shown as a variable resistor in the drawing) or a current (a source current) to flow to the capacitor c should be changed. Consequently, the inclination of the sawtooth wave can be varied.

In FIGS. 15(a) and 15(b), "SAW" indicates a sawtooth wave and "CV" indicates a control voltage, and the switching control of the DC—DC converting circuit is carried out based on a signal "Sc" (which has an H level if CV is larger than SAW) determined by a level comparison therebetween.

The frequency of Sc is low because the inclination of the sawtooth wave SAW is small as shown in FIG. 15(a), and the frequency of Sc is increased because the inclination of the sawtooth wave SAW is very great as shown in FIG. 15(b).

The switching frequency is determined by the frequency of Sc. For example, therefore, it is preferable that a frequency should be controlled to swing between an "X" kHz (kilohertz) and "Y" kHz and "Z" Hz should be set to be the frequency of a fluctuation by the application of the fluctuation to the frequency (the frequency of a change related to a current supplied to the capacitor c is defined to be "Z" Hz and a degree of the change is defined to be (Y−X)/X).

As indicated by FIGS. 15(a) and 15(b), referring to the fluctuation in the PWM control, the switching frequency is changed with a variation in the inclination of the sawtooth wave SAW. In the case in which the level of CV is constant, the duty cycle (or duty ratio) of Sc is almost constant. As the fall of the sawtooth wave SAW is very great, the stability of the duty cycle is increased.

However, the suppression of a beat noise in the related art circuit structure is a matter formed at the sacrifice of the efficiency of the circuit. Accordingly, there is a problem in that a power loss is generated. In other words, an increase in the efficiency and the suppression of the beat noise are contrary to each other.

Therefore, it is an object of the invention to cause an increase in an efficiency and the suppression of a beat noise to be compatible with each other in a discharge lamp lighting circuit.

SUMMARY OF THE INVENTION

The invention provides a discharge lamp lighting circuit comprising a DC—DC converting circuit for converting a voltage input from a DC power source into a desirable DC voltage, a DC-AC converting circuit provided in a latter stage of the circuit, and a control circuit for controlling to turn ON a discharge lamp, in which the following structures are employed.

(A) The DC—DC converting circuit has a switching element to be connected to a transformer and a primary winding thereof, and control is carried out in such a manner that the transformer stores energy while the switching element is set in an ON state in response to a signal sent from the control circuit, the energy is output from a secondary winding of the transformer while the switching element is set in an OFF state in response to a signal sent from the control circuit, and the switching element is turned ON when the energy is completely output from the secondary winding in a stable lighting state of the discharge lamp.

(B) An output current or power related to the discharge lamp is controlled for an ON period of the switching element in response to a signal sent from the control circuit.

(C) Fluctuation generating means for applying a fluctuation to the control of the output current or power in the (B) is provided.

According to the invention, therefore, a fluctuation is applied in the control of the output current or power related to the discharge lamp. Consequently, the switching frequency can be changed to suppress a beat noise. In addition, control is carried out to always turn ON the switching element when the energy stored in the transformer constituting the DC-AC converting circuit is completely output from the secondary winding. Consequently, it is possible to reduce a power loss caused by turning ON the switching element. Thus, it is possible to prevent the efficiency of the circuit from being deteriorated.

DETAILED DESCRIPTION OF THE INVENTION

Figure 1:
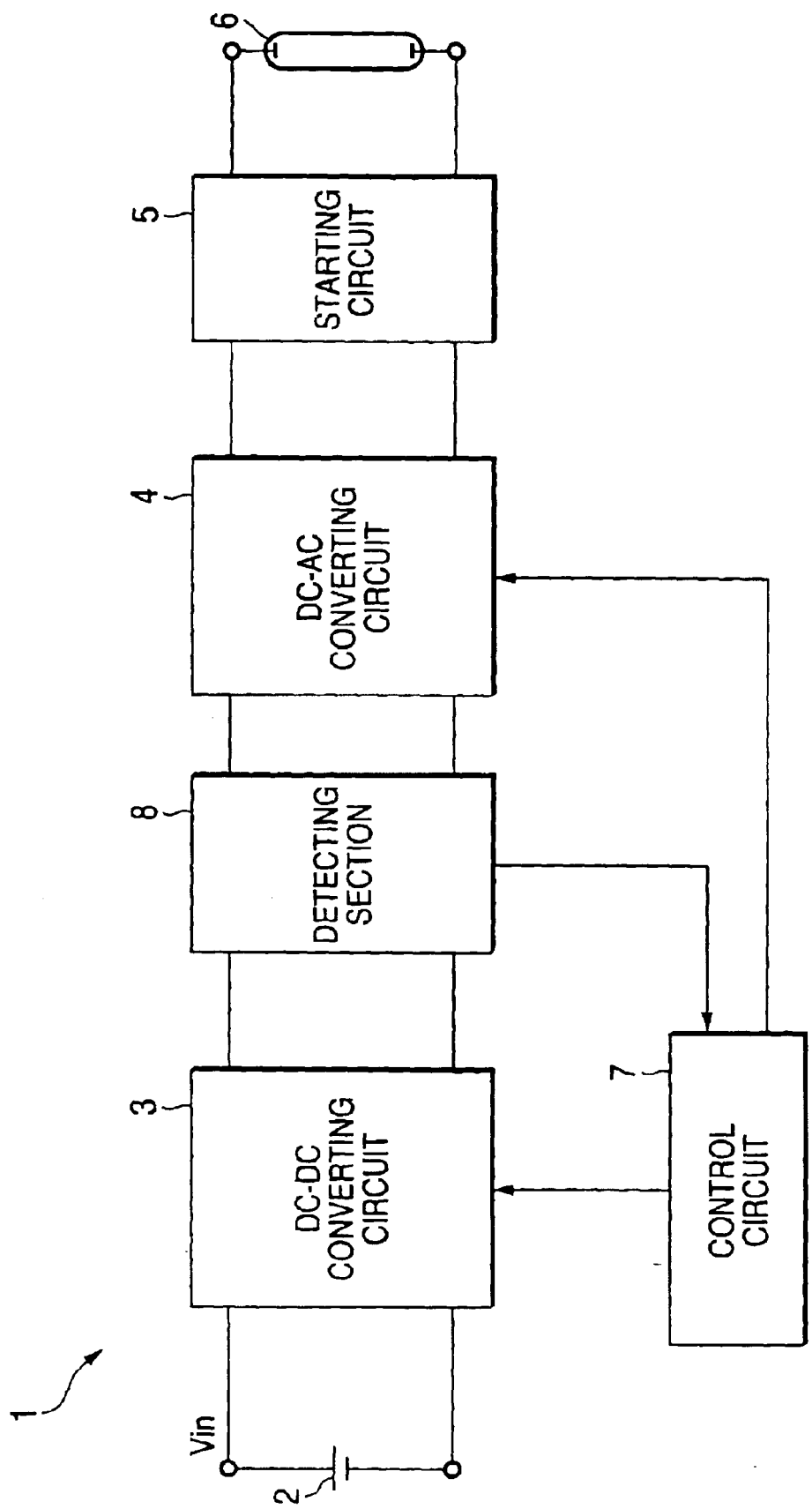
FIG. 1 is a circuit block diagram showing an example of the basic structure of a discharge lamp lighting circuit according to the invention.

FIG. 1 shows the basic structure of a lighting circuit according to the invention, wherein a discharge lamp lighting circuit 1 comprises a DC power source 2, a DC—DC converting circuit 3, a DC-AC converting circuit 4, a starting circuit 5 and a control circuit 7.

The DC—DC converting circuit 3 serves to receive a DC input voltage (which will be referred to as "Vin") from the DC power source 2 and to convert the same DC input voltage into a desirable DV voltage, and a flyback type DC—DC converter is used for the DC—DC converting circuit 3.

The DC-AC converting circuit 4 is provided for converting the output voltage of the DC—DC converting circuit 3 into an AC voltage and then supplying the same AC voltage to a discharge lamp 6 through the starting circuit 5. For example, the DC-AC converting circuit 4 may comprise a full-bridge type circuit using four semiconductor switching elements and a driving circuit thereof, and serve to contrarily ON/OFF control two pairs of switching elements, thereby outputting an AC voltage.

The starting circuit (a so-called starter) 5 is provided for generating a high voltage pulse signal for starting (a pulse for starting) with respect to the discharge lamp 6 to start up the discharge lamp 6 and the same signal is superposed on the AC voltage output from the DC-AC converting circuit 4 and is applied to the discharge lamp 6.

The control circuit 7 serves to control a power given to the discharge lamp 6 and to control the output of the DC—DC converting circuit 3 upon receipt of a detection signal for a voltage applied to the discharge lamp 6 and a current flowing to the discharge lamp 6 or a voltage and a current which correspond thereto. More specifically, the control circuit 7 is provided for controlling a power to be supplied corresponding to the state of the discharge lamp 6 and, for example, sends a control signal to the DC—DC converting circuit 3 to control an output voltage thereof upon receipt of a detection signal sent from a detecting section 8 for detecting the output voltage or current of the DC—DC converting circuit 3. Moreover, a control signal is sent to the DC-AC converting circuit 4 to be controlled. The control circuit 7 also serves to raise the voltage to be supplied to the discharge lamp 6 to have a certain level before turning ON the discharge lamp 6, thereby carrying out output control for reliably turning ON the discharge lamp 6. For example, a PWM (pulse width modulation) method and a PFM (pulse frequency modulation) method may be used as a switching control method.

Figure 2:
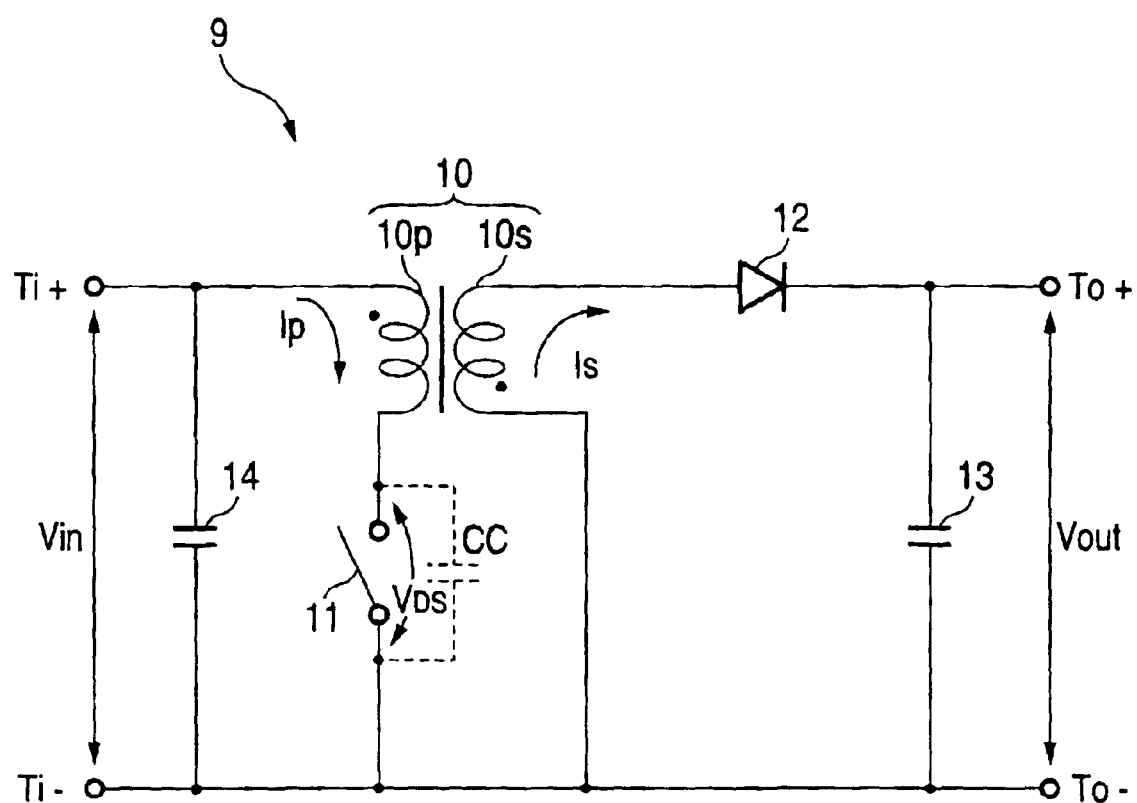
FIG. 2 is a diagram for explaining an example of the structure of a DC—DC converting circuit.

FIG. 2 shows an example 9 of the structure of the DC—DC converting circuit 3, in which the following elements are provided (numerals in parentheses indicate designations).

transformer (10),
switching element (11),
rectifier diode (12), and
smoothing capacitor (13).

Terminals "Ti$^+$" and "Ti$^-$" shown in the drawing denote input terminals, and the DC input voltage "Vin" is supplied thereto and a capacitor 14 is provided therebetween. Moreover, "To$^+$" and "To$^-$" denote output terminals, and an output voltage (which will be referred to as "Vout") obtained after voltage conversion is sent to a latter stage circuit (the DC-AC converting circuit 4). A black circle is added to each winding of the transformer 10 in order to indicate a winding start.

The switching element 11 is connected to a primary winding 10p of the transformer 10, and a signal is supplied from the control circuit 7 to the control terminal of the switching element 11. In the drawing, the switching element 11 is simplified by the symbol of a switch, and an N-channel MOSFET (a field effect transistor) is used (in that case, a drain is connected to (a terminal on the winding end side of) the primary winding 10p of the transformer 10 and a source is connected to the input terminal "Ti$^-$"). A capacitor CC shown in a broken line of the drawing indicates a capacity component (or a parasitic capacitance) of the switching element 11.

The rectifier diode 12 and the smoothing capacitor 13 are provided on the secondary side of the transformer 10, and one of the ends (a terminal on the winding end side) of a secondary winding 10s of the transformer 10 is connected to the anode of the rectifier diode 12 and the other end (a terminal on the winding start side) of the secondary winding 10s is connected to a line coupling the terminals "Ti$^-$" and "To$^-$". The cathode of the rectifier diode 12 is connected to the terminal "To$^+$" and one of the ends of the smoothing capacitor 13. The smoothing capacitor 13 is provided between the output terminals "To$^+$" and "To$^-$" and a voltage on both ends of the capacitor 13 is output as Vout.

In the drawing, "Ip" denotes a primary side current of the transformer 10 and "Is" denotes a secondary side current of the transformer 10, and "VDS" denotes a voltage on both ends of the switching element 11 (a drain-source voltage in an FET).

In such a circuit having a flyback type structure, the transformer 10 stores energy while the switching element 11 is defined in an ON state upon receipt of a signal from the control circuit 7, and the same energy is output from the secondary winding 10s of the transformer 10 in response to the signal sent from the control circuit 7 while the switching element 11 is set in an OFF state. In that case, there are three kinds of operation modes (a current continuation mode, a current boundary mode and a current discontinuation mode).

Each mode will be briefly described. In the current continuation mode, control is carried out in such a manner that the switching element 11 is turned ON before the energy stored in the transformer 10 is completely discharged to the secondary side of the transformer 10. In the current boundary mode, moreover, control is carried out in such a manner that the switching element 11 is turned ON when the energy stored in the transformer 10 is completely discharged to the secondary side of the transformer 10. In the current discontinuation mode, control is carried out in such a manner that the switching element 11 is turned ON after a certain period (a discontinuation period) since the energy stored in the transformer 10 is completely discharged to the secondary side of the transformer 10.

In respect of an increase in an efficiency and a reduction in a size of the lighting circuit, the current boundary mode is useful. One of the reasons is that a current flowing the moment the switching element 11 is turned ON can be set to be zero ampere so that the loss of the switching element 11 is not generated (a loss is not generated during an ON operation) More specifically, in the case in which attention is paid to a power loss in the reverse recovery time of the rectifier diode 12 provided on the secondary side of the transformer 10, the switching element 11 is turned ON while a current flows to the rectifier diode 12 so that the rectifier diode 12 is brought into a backward bias state in the current continuation mode. Consequently, a power loss is generated in the reverse recovery time. To the contrary, the current of the rectifier diode 12 is set to be zero ampere and the switching element 11 is then turned ON in the current boundary mode and the current discontinuation mode. Consequently, the power loss is not generated in the reverse recovery time.

Figure 3:
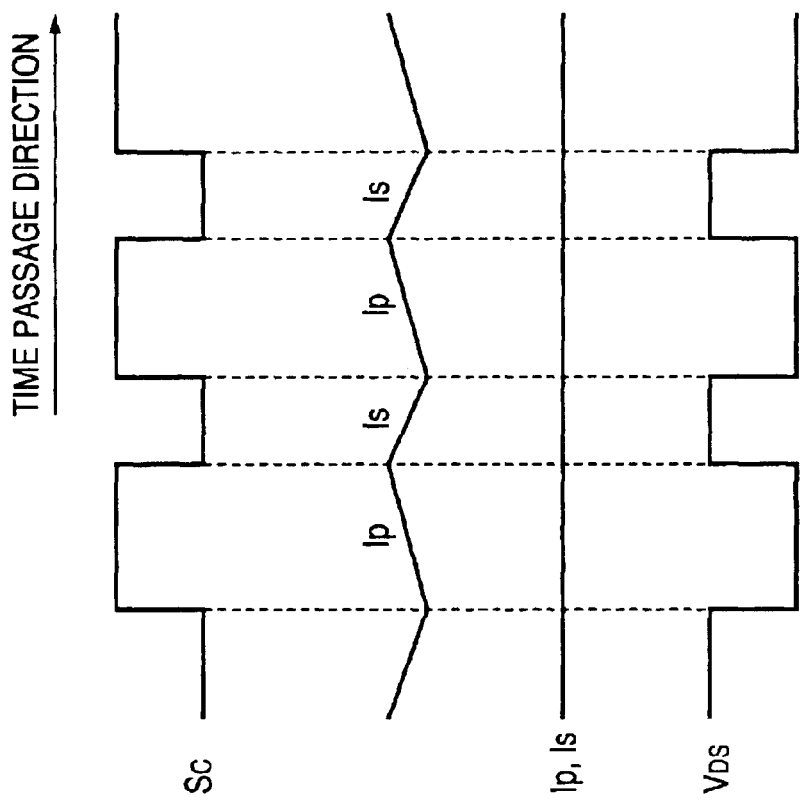
FIGS. 3(a) and 3(b) are diagrams for explaining an operation in a current continuation mode.
Figure 3:
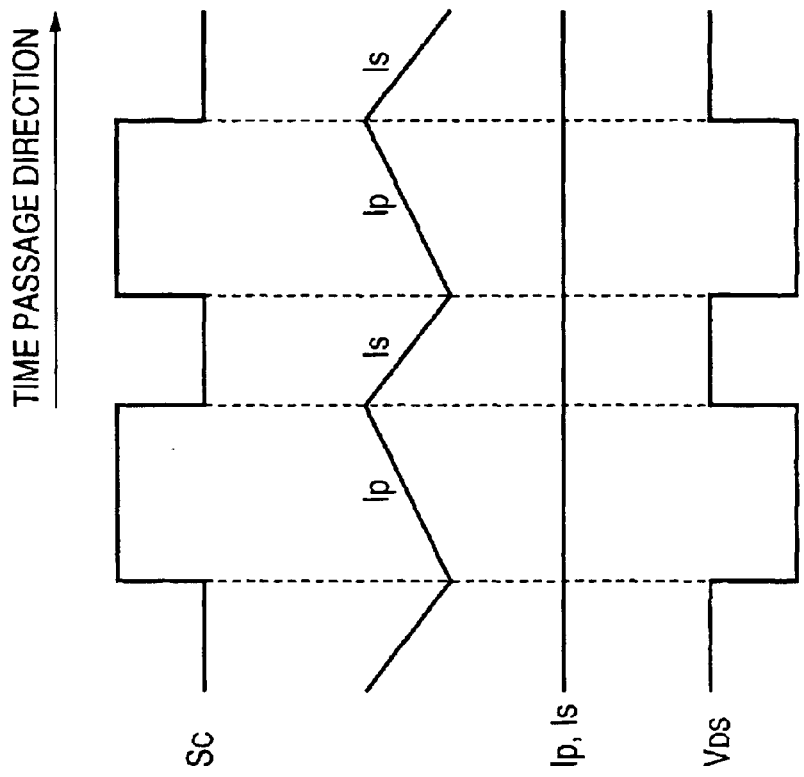

FIGS. 3(a) and 3(b) schematically show the waveform of each portion in the current continuation mode, in which "Sc" denotes a control signal defining the ON/OFF state of the switching element 11 and "Ip", and "Is" and "VDS" are as described above. FIG. 3(a) shows the case in which the switching frequency is low and FIG. 3(b) shows the case in which the switching frequency is high.

At time of control in the operation mode, Ip and Is are not zero at the rise time of Sc and the fall time of VDS. Therefore, a switching loss is generated in the ON operation as a product of Ip and VDS, and furthermore, a reverse recovery loss is generated by residual Is.

Figure 14:
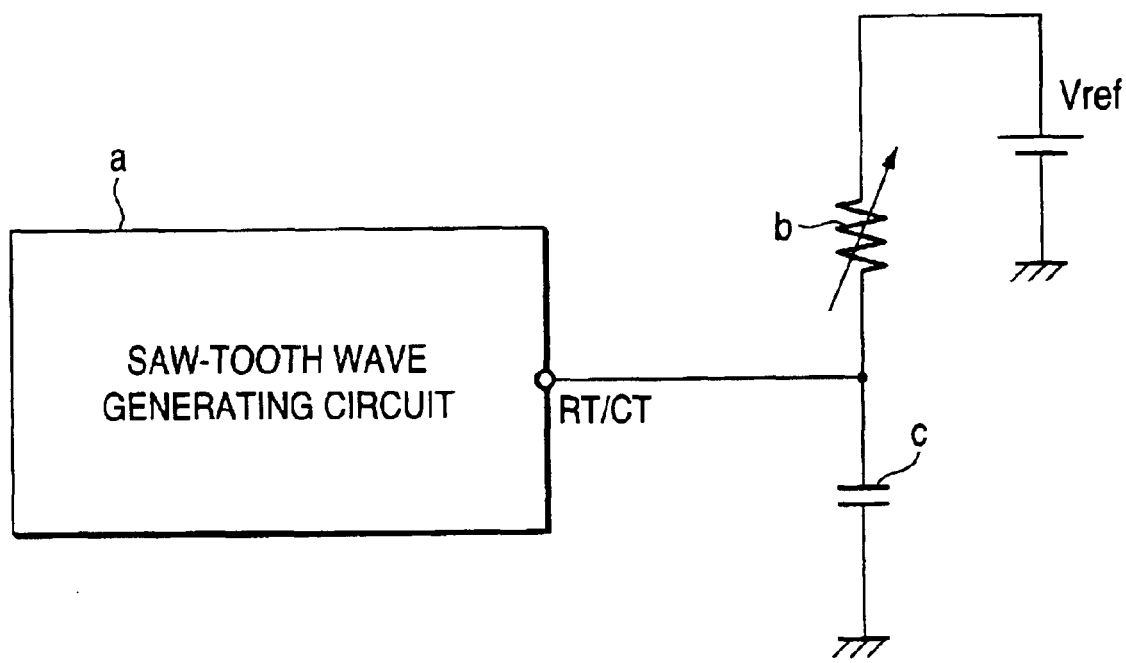
FIG. 14 is a diagram for explaining the application of a fluctuation related to a switching frequency, together with FIGS. 15(a) and 15(b), illustrating the main part of a control circuit.
Figure 15:
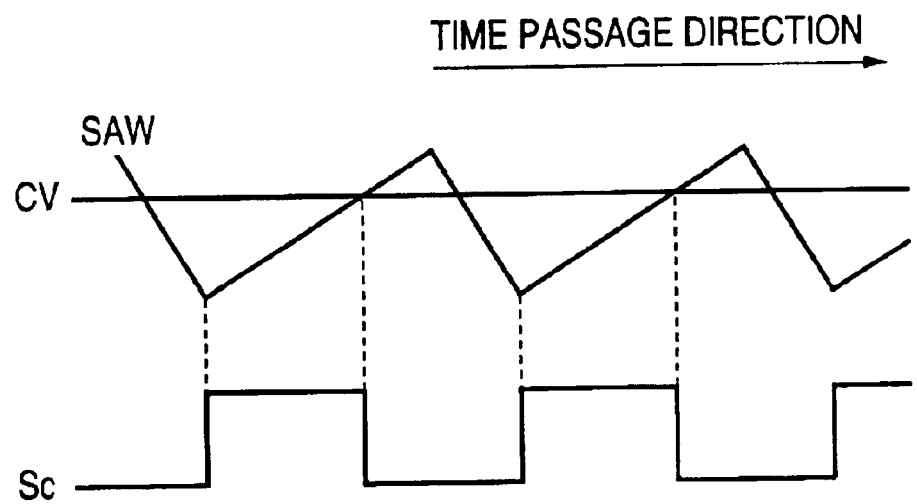
FIGS. 15(a) and 15(b) are schematic waveform diagrams for explaining an operation.
Figure 15:
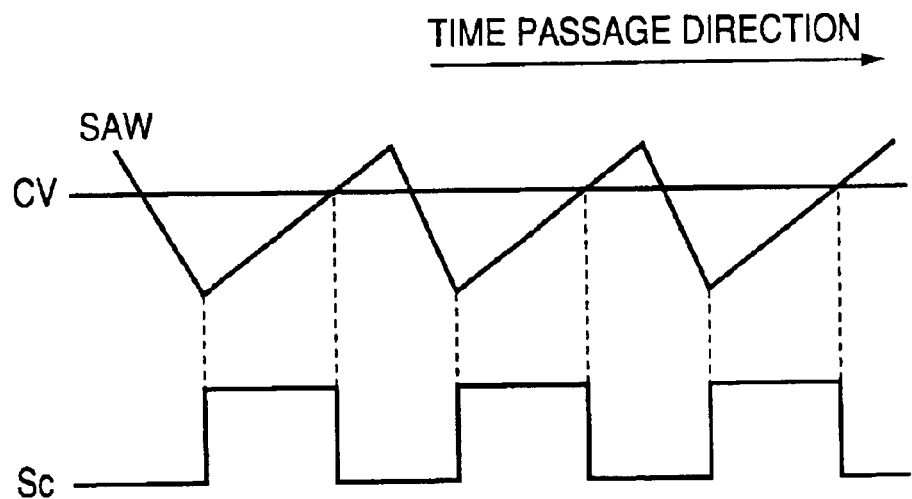

When a fluctuation is applied to the switching frequency to be increased as described with reference to FIGS. 14 and 15(a) and 15(b) in a state in which the current value of Is is not set to be zero, for example, the frequency of Sc is increased and the duty cycle of Sc is not changed as shown in FIG. 3(b) (it is assumed that a control level is constant). More specifically, the inclinations of Ip and Is (inclinations to a time base) are not related to a change in the switching frequency and are maintained to be constant, and a time integral value of Is is not changed. Accordingly, a loss is also maintained to be great as shown in FIG. 3(b).

Figure 4:
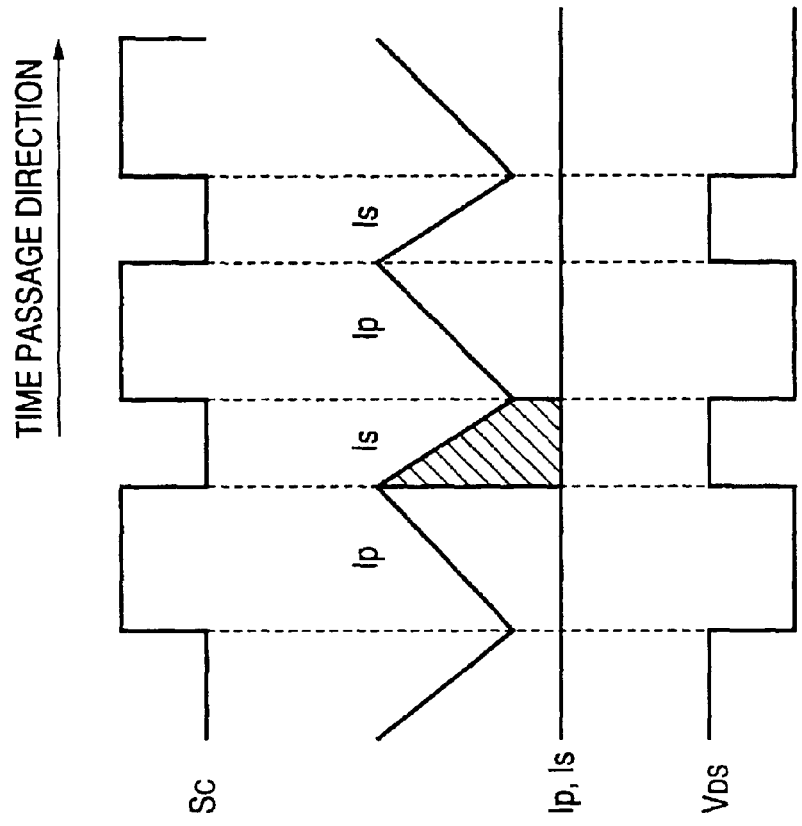
FIGS. 4(a) and 4(b) are diagrams for explaining an operation in a current boundary mode.
Figure 4:
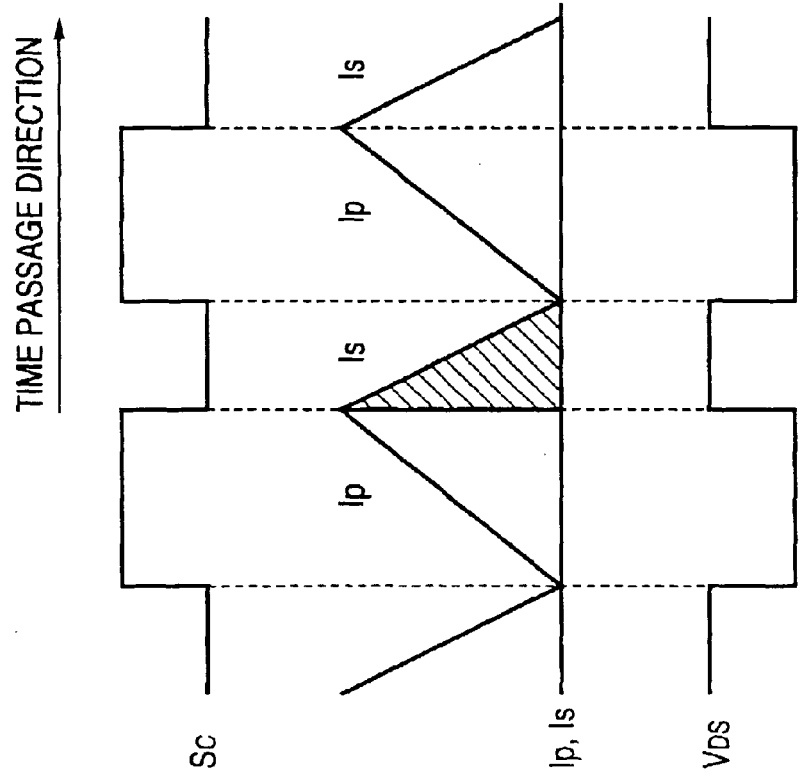

FIGS. 4(a) and 4(b) schematically show the waveform of each portion in the current boundary mode, illustrating a situation in which the output power and current (the time integral value of Is) is not changed but a fluctuation is applied to the switching frequency as described with reference to FIGS. 14 and 15(a) and 15(b). "Sc", "Ip", "Is" and "VDS" are as described above, and FIG. 4(a) shows the case in which the switching frequency is low and FIG. 4(b) shows the case in which the switching frequency is high.

In FIG. 4(a), Ip and Is are zero at the rise point of Sc and the fall point of VDS. Therefore, a loss is not generated when the switching element 11 is turned ON, and furthermore, a reverse recovery loss can be prevented from being generated by the residual Is.

As shown in FIG. 4(b), when the switching frequency is increased, the loss is generated again. More specifically, the switching control is carried out in such a state that Is is not set to be zero in the same manner as in the current continuation mode. As a result, the loss is generated (because the time integral value of Is is not changed so that the area of a triangle (a portion shown in a slanting line) related to Is in FIG. 4(a) is equal to the area of a trapezoid (a portion shown in a slanting line) related to Is in FIG. 4(b)).

The total amount of the loss in the reverse recovery time of the diode is proportional to the switching frequency. In the current continuation mode, therefore, the power loss is increased when the frequency is raised. In the case in which the modes are compared with each other for the efficiency of a whole circuit, moreover, it is clear that an electrical efficiency is high in the current boundary mode if the switching frequency is comparatively high (several hundreds kilohertz or more) (In the current discontinuation mode, the electrical efficiency is lower than that in the current boundary mode by the influence of a resonance operation for the discontinuation period).

Accordingly, it is an object to eliminate a power loss generated by the capacity component of the switching element 11 and the reverse recovery time of the rectifier diode 12. In the case in which a circuit (DC—DC converter) of a flyback type is to be driven at a comparatively high switching frequency, moreover, an operation in the current boundary mode is suitable for reducing a loss in a whole lighting circuit and decreasing the size of a device.

When the switching frequency is increased without changing the output current and power as shown in FIG. 4(b), the loss is generated again.

In the invention, a fluctuation is permitted in the control of the output power and current related to a discharge lamp. Consequently, the control is carried out in the current boundary mode irrespective of the switching frequency. More specifically, a fluctuation in the control current or power is accepted and control is carried out to turn ON the switching element 11 the moment the energy stored in the transformer 10 in the ON operation of the switching element 11 is completely output from the secondary winding of the transformer 10.

The control of the output current and power to be sent to the discharge lamp is carried out for the ON period of the switching element in response to a signal sent from the control circuit. The control of the output current or power includes a method of designing a control circuit from the beginning as a circuit for applying a fluctuation and a method of providing fluctuation generating means (or fluctuation applying means) in an existing control circuit. In any of the methods, it is preferable that the fluctuation should be applied in at least the stable lighting state of the discharge lamp. More specifically, the "stable lighting state" has the purport of removing an unstable state obtained immediately after turning ON the discharge lamp or a transient state to reach stationary lighting, and has an object to prevent extinction from being generated as a result of the unstable lighting state of the discharge lamp which is obtained by the fluctuation in the control current. It is a matter of course that the "stable lighting state" is not restricted if the degree of the application of a fluctuation is so low as not to be linked with the cause of instability.

Figure 5:
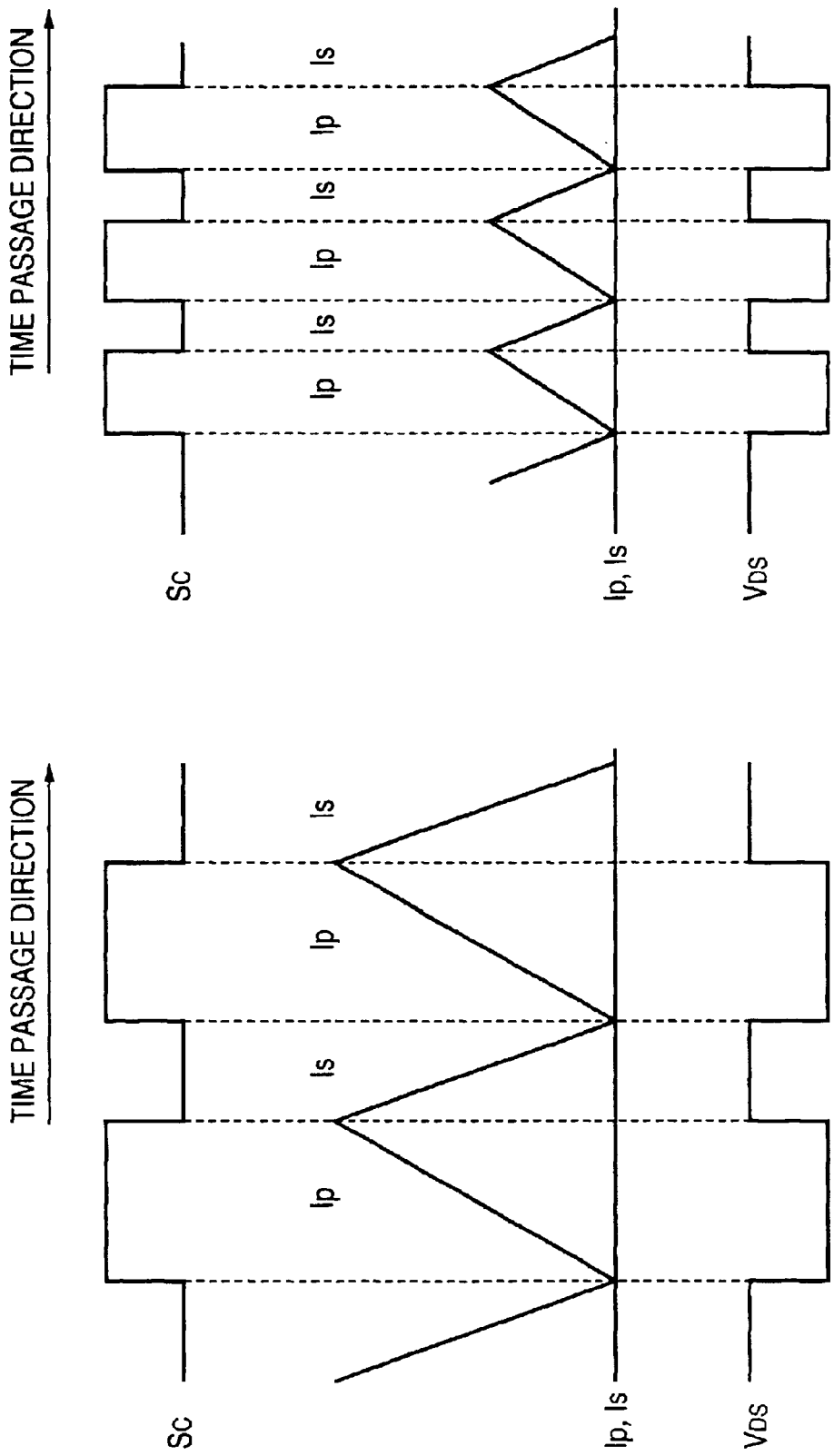
FIGS. 5(a) and 5(b) are diagrams for explaining an operation according to the invention.

FIGS. 5(a) and 5(b) schematically show the waveform of each section of the DC—DC converting circuit in the case in which the control according to the invention is carried out. "Sc", "Ip", "Is" and "VDS" are as described above, and FIG. 5(a) shows the case in which the switching frequency is low and FIG. 5(b) shows the case in which the switching frequency is high.

In FIG. 5(a), an output power and current (a time integral value of Is) is set to "1". On the other hand, when the output power is halved, the frequency of Sc is doubled as shown in FIG. 5(b). More specifically, the switching frequency is inversely proportional to the control power and current. By applying a fluctuation to the control power, therefore, it is possible to change the switching frequency.

In addition, in both of the drawings, Ip and Is are zero on the rise point of Sc and the fall point of VDS. Therefore, a loss is not generated when the switching element 11 is turned ON, and furthermore, a reverse recovery loss is not generated by the residual Is. More specifically, in FIGS. 4(a) and 4(b), the control is carried out with the time integral value of Is unchanged in both Figures. Therefore, a problem of the loss arises when the frequency is increased. In the example, the time integral value of Is is changed depending on the control power. Consequently, the control in the current boundary mode can be protected (for example, if the power and the current are halved, the switching frequency is doubled so that a width (a time interval) of Is is halved and a height of Is is halved). Consequently, it is possible to suppress a beat noise without deteriorating an efficiency.

Figure 6:
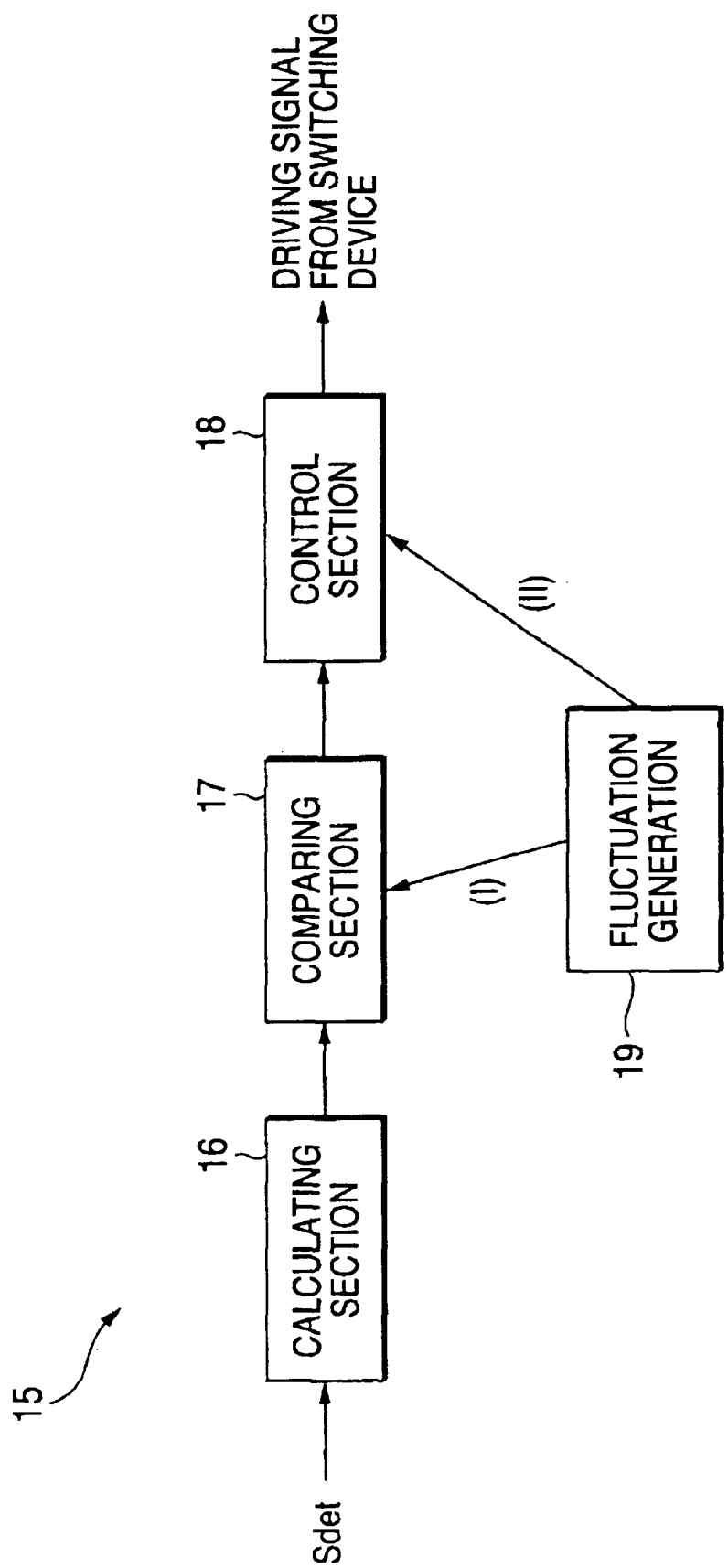
FIG. 6 is a diagram showing an example of the structure of a main part in a control circuit according to the invention.

FIG. 6 shows an example 15 of the structure of the main part of the control circuit according to one embodiment of the invention, in which the following elements are provided (numerals in parentheses indicate designations).

Calculating section (16),

Comparing section (17),

Control section (18), and

Fluctuation generating means (19).

"Sdet" shown in the drawing indicates a detection signal required for the control to turn ON the discharge lamp 6, and is detected by the detecting section 8 and is sent to the calculating section 16, for example.

The calculating section (or a power control section) 16 is provided for controlling the power of the discharge lamp 6, and calculates a control value (a command value) in response to the detection signal Sdet and sends the same control value to the comparing section 17 in a latter stage. For example, the state of the discharge lamp 6 is varied in the case in which the discharge lamp 6 is turned ON in a cold state (a so-called cold start) and the case in which the discharge lamp 6 which is still warm is turned ON. Therefore, the calculating section 16 is provided for properly controlling the ON operation in each state (since related art configurations are enough for a calculation processing, description thereof will be omitted).

An error amplifier is used for the comparing section 17, for example, and an output is supplied from the calculating section 16 to one of inputs and a predetermined reference voltage is supplied to the other input. A control voltage (an error signal) indicative of their difference is sent to the control section 18 in the latter stage.

The control section 18 serves as one function to compare the levels of sawtooth waves for a signal sent from the comparing section 17, thereby generating a signal corresponding to the result of the comparison, and is constituted by using an IC for PWM control or an IC for PFM control. For example, in the PWM control, a duty cycle related to a control signal is defined corresponding to the result of the level comparison and the same signal is sent as a driving signal to the switching element 11 of the DC—DC converting circuit 3 through a driving circuit, which is not shown.

Thus, a feedback loop is formed to control turning ON the discharge lamp. Fluctuation generating means 19 is provided for applying a fluctuation to the control of the output current or power related to the discharge lamp. As described above, in the invention, the fluctuation generating means 19 serves to set a predetermined frequency or variation range to apply a fluctuation to the control power or current without causing the switching frequency to have a fluctuation with the control power or current unchanged under constant conditions.

Figure 7:
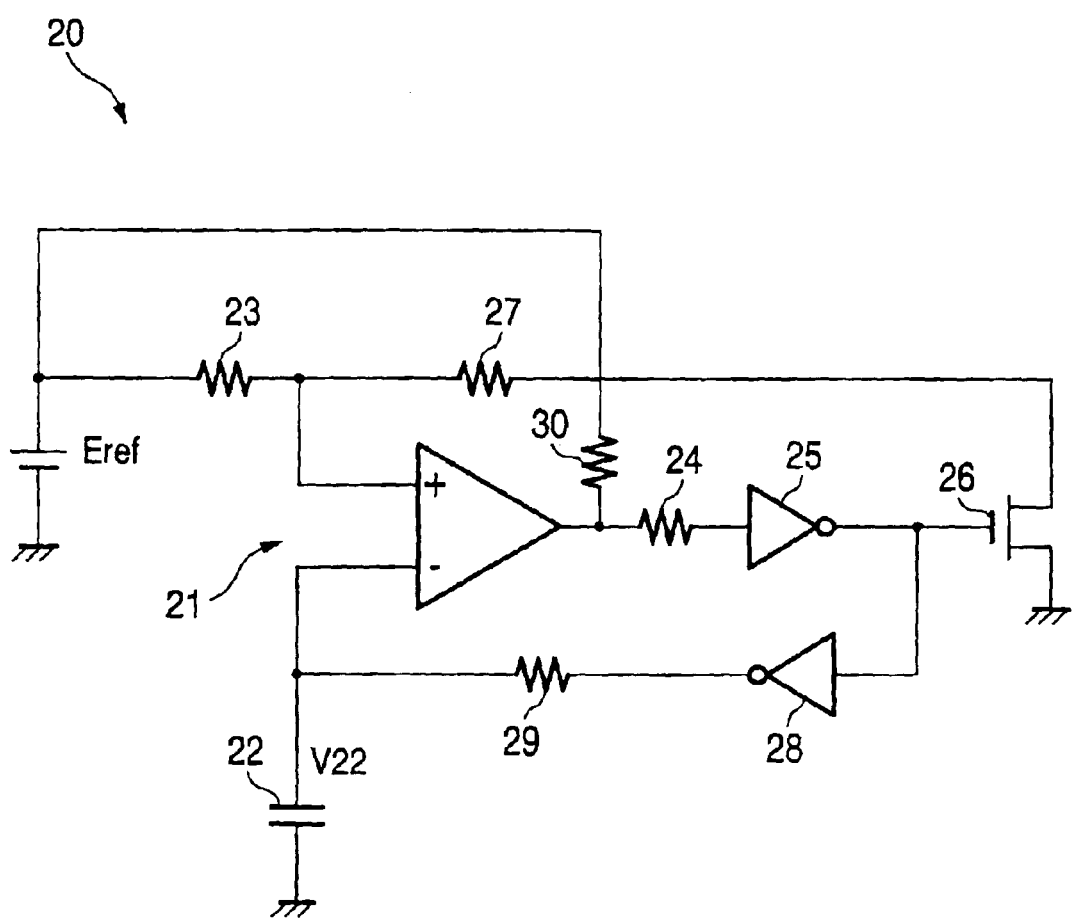
FIG. 7 is a circuit diagram showing an example of the structure of a basic portion in fluctuation generating means according to the invention.

FIG. 7 shows an example 20 of the structure of a circuit in a basic section related to the fluctuation generating means.

A comparator 21 has a hysteresis characteristic and a negative input terminal thereof is grounded through a capacitor 22. A reference voltage "Eref" indicated as a symbol of a constant voltage source is supplied to the positive input terminal of the comparator 21 through a resistor 23, and the output signal of the comparator 21 is sent from a resistor 24 to the control terminal of a switch element 26 (an FET is used and is indicated as a simplified symbol in the drawing) through a NOT (negation) gate 25, and ON/OFF states are brought corresponding to the level (H or L) of the output signal of the gate 25.

The non-control terminal (a terminal which is not provided on the ground side) of the switch element 26 is connected to the positive input terminal of the comparator 21 through a resistor 27.

Moreover, the output signal of the NOT gate 25 is sent to a NOT gate 28 and the output terminal of the NOT gate 28 is connected to one of the ends of the capacitor 22 (a terminal connected to the negative input terminal of the comparator 21) through a resistor 29.

A resistor 30 provided on the output terminal of the comparator 21 is a pull-up resistor and is connected to a constant voltage source having the reference voltage Eref.

In the circuit, in the case in which a voltage on both ends of the capacitor 22 (which will be referred to as "V22") is lower than a first threshold in the comparator 21, the output signal of the comparator 21 is set to have an H (high) level so that the switch element 26 is turned OFF and the capacitor 22 is charged through the resistor 29. Moreover, in the case in which V22 is higher than a second threshold in the comparator 21, the output signal of the comparator 21 is set to have an L (low) level so that the switch element 26 is turned ON (the resistance voltage division value of Eref is supplied as the positive input of the comparator 21) and the capacitor 22 is discharged through the resistor 29. Such a cycle is repeated so that V22 is changed. More specifically, V22 is changed with a frequency defined by a time constant of charge/discharge based on a voltage range determined by a threshold in relation to the hysteresis characteristic of the comparator 21, and the electrostatic capacity of the capacitor 22 and the resistance value of the resistor 29.

In order to generate a fluctuation in a frequency by using such a circuit, for example, the following configurations may be employed.

(I) A configuration in which a signal generated by the fluctuation generating means 19 is caused to act on the comparing section 17; and (II) A configuration in which the signal generated by the fluctuation generating means 19 is caused to act on the control section 18.

Figure 8:
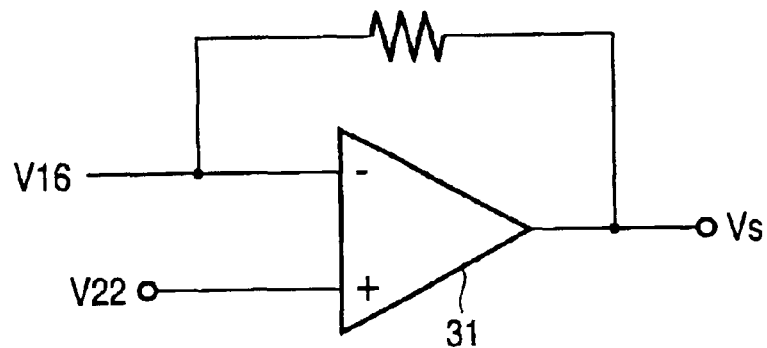
FIG. 8 is a circuit diagram for explaining a configuration for applying a fluctuation to an error amplifier, together with FIGS. 9 and 10(a) and 10(b), illustrating an example in which the reference voltage of the error amplifier is changed.
Figure 9:
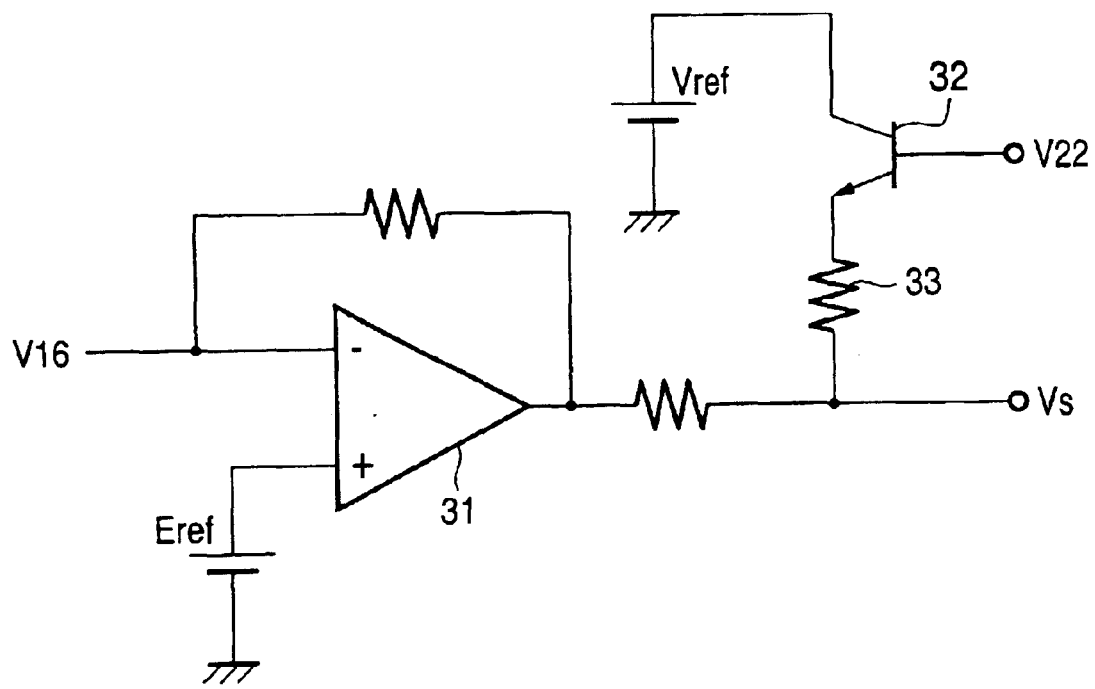
FIG. 9 is a circuit diagram showing an example in which the output voltage of the error amplifier is changed.

FIGS. 8 and 9 show an example of the structure of (I).

In FIG. 8, the voltage V22 is supplied to the positive input terminal of the error amplifier 31 and is compared with a signal voltage (which will be referred to as "V16") supplied from the calculating section 16 to the negative input terminal of the error amplifier 31. More specifically, in the case in which a constant reference voltage is applied to the positive input terminal of the error amplifier 31, a difference between the reference voltage and the signal voltage V16 is simply obtained as a control voltage "Vs". By using V22 to be changed with a predetermined frequency in place of the reference voltage, a fluctuation can be applied to the control voltage (even if the signal voltage supplied from the calculating section 16 is constant, accordingly, the control voltage Vs output from the error amplifier 31 is changed on a time basis).

In FIG. 9, the voltage V22 is supplied to the base of an NPN transistor 32 to influence the output of the error amplifier 31 through a resistor 33 connected to the emitter of the NPN transistor 32. More specifically, since the constant reference voltage "Eref" is supplied to the positive input terminal of the error amplifier 31 and the signal voltage V16 is supplied from the calculating section 16 to a negative input terminal thereof, a difference therebetween is simply obtained as the control voltage Vs in this condition and V22 acts on the control voltage Vs through the resistor 33 from the NPN transistor 32 to be an emitter follower. In other words, the NPN transistor 32 has a collector to which the reference voltage "Vref" is supplied, an emitter connected to the output terminal of the error amplifier 31 through the resistor 33, and a base to which V22 to be changed on a time basis is supplied. Consequently, a fluctuation is applied to the output voltage of the error amplifier 31.

In any case, the switching frequency is reduced if the level of the control voltage Vs by the comparing section 17 is increased by the application of the fluctuation (or the switching frequency is increased if the level of the control voltage Vs is reduced).

Figure 10:
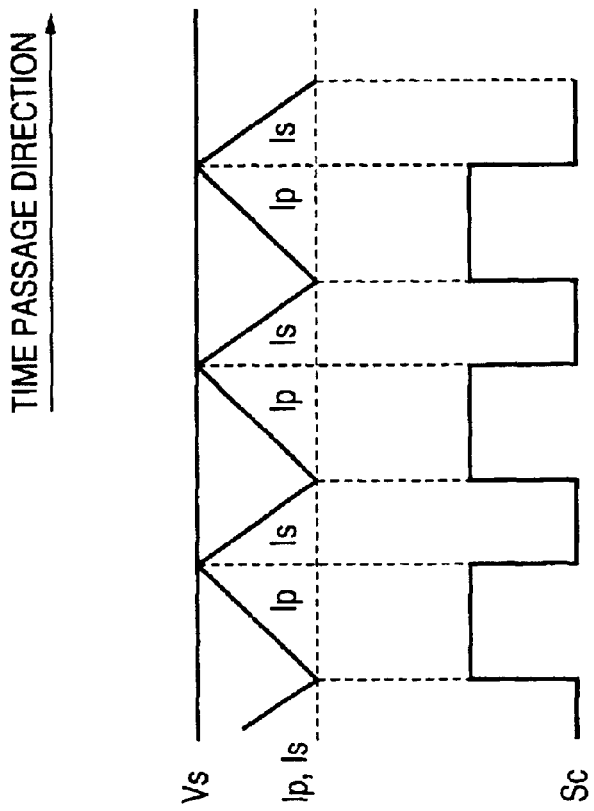
FIGS. 10(a) and 10(b) are schematic waveform diagrams for explaining an operation.
Figure 10:
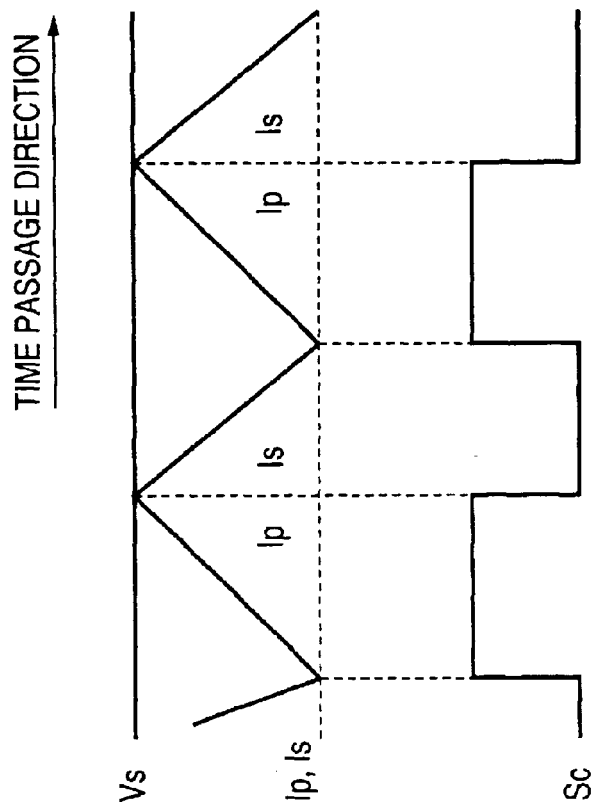

FIGS. 10(*a*) and 10(*b*) schematically show the relationship between the control voltages Vs, Ip and Is and the signal Sc.

In the structures shown in FIGS. 8 and 9, the level of Vs fluctuates with V22. Therefore, the frequency of Sc is reduced in a state in which the level of Vs is comparatively high as shown in FIG. 10(*a*) and the frequency of Sc is increased in a state in which the level of Vs is comparatively low as shown in FIG. 10(*b*).

Figure 11:
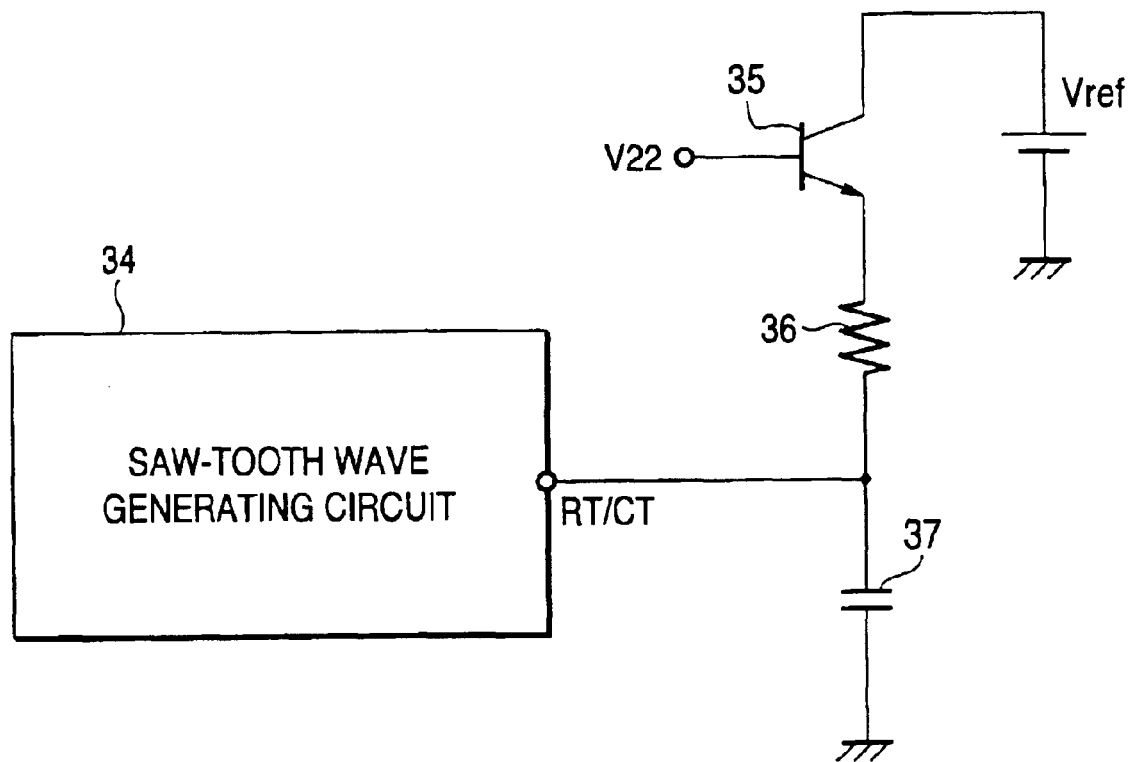
FIG. 11 is a circuit diagram for explaining another configuration according to the application of a fluctuation, and together with FIGS. 12 and 13(a) and 13(b), illustrating an example in which the frequency of a sawtooth wave generating circuit is changed.
Figure 12:
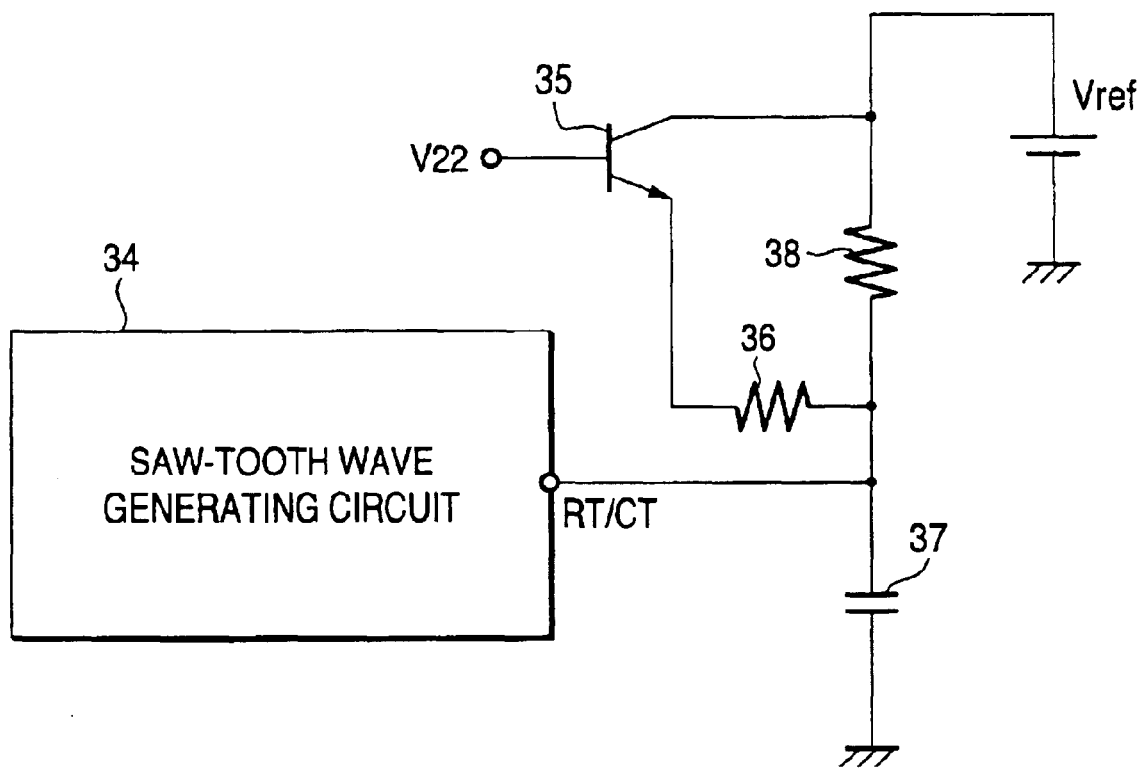
FIG. 12 is a circuit diagram showing a variant of the structure in FIG. 11, FIGS. 13(a) and 13(b) are schematic waveform diagrams for explaining an operation.

FIGS. 11 and 12 show an example of the structure of (II). In these drawings, a sawtooth wave generating circuit 34 may be the same as the circuit "a" in FIG. 14 and has a structure such that a frequency is determined by setting a resistor and a capacitor which are connected to a terminal "RT/CT".

In FIG. 11, the voltage V22 is supplied to the base of the NPN transistor 35, and the emitter of the NPN transistor 35 is connected to a terminal "RT/CT" and one of the ends of a capacitor 37 (a terminal which is not provided on the ground side) through a resistor 36. More specifically, V22 acts on the terminal "RT/CT" through the resistor 36 from the transistor 35 to be an emitter follower. A predetermined voltage Vref is supplied to the collector of the transistor 35.

FIG. 12 is different from FIG. 11 in that a resistor 38 is provided between the collector of the transistor 35 and the terminal "RT/CT", and has the same basic functions.

In any case, since the control power and current is inversely proportional to the switching frequency as described above, one of them is varied if the other is changed. In other words, if the switching frequency is changed, the control power and current is varied. Therefore, it is preferable that a source current to be supplied to the capacitor 37 connected to the terminal "RT/CT" should be changed.

Figure 13:
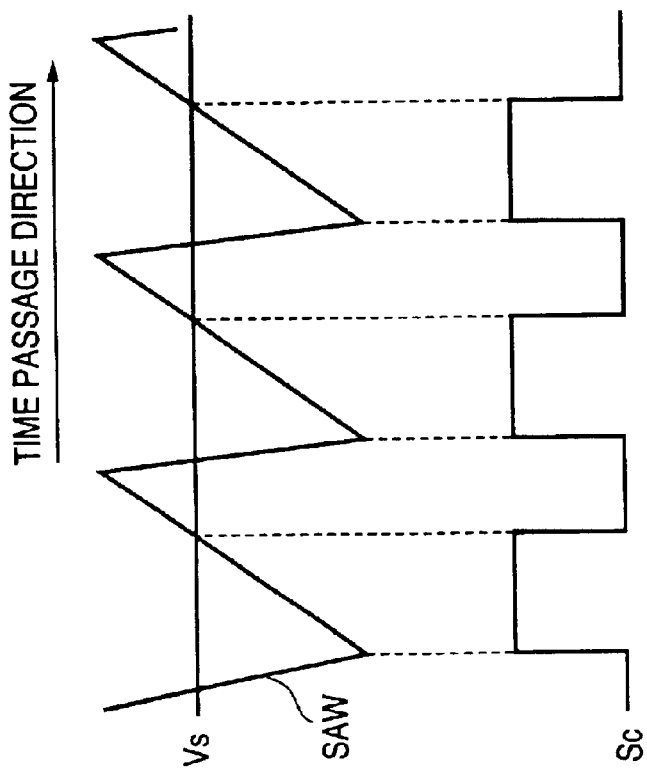
Figure 13:
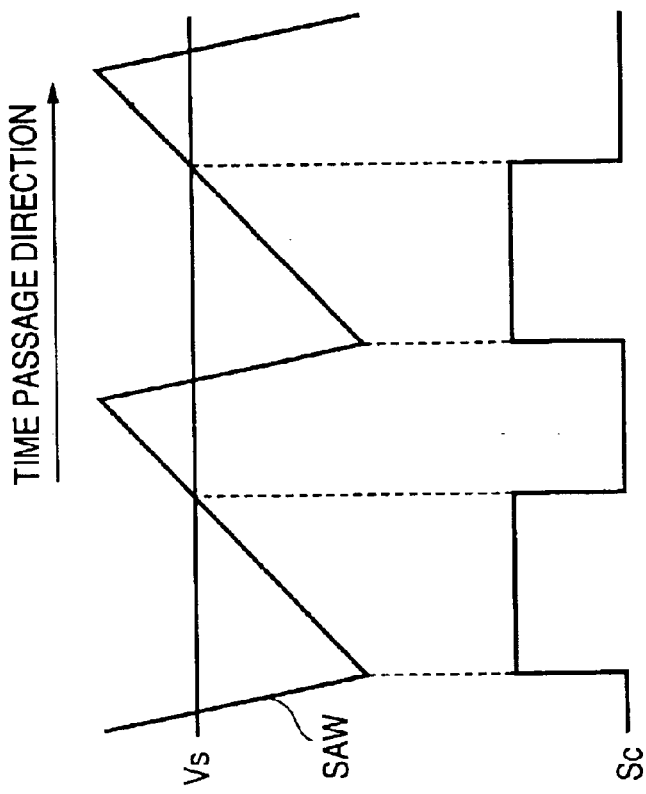

FIGS. 13(*a*) and 13(*b*) schematically show the relationship among the control voltage Vs, the sawtooth wave SAW and the signal Sc.

In the structures shown in FIGS. 11 and 12, the level of Vs does not fluctuate as long as the reference voltage Eref in the comparing section 17 is constant and the output of the calculating section 16 is constant, and the inclination of a sawtooth wave is changed by V22. Accordingly, the frequency of Sc is reduced in a state in which the inclination of SAW is comparatively small as shown in FIG. 13(*a*) and the frequency of Sc is increased in a state in which the inclination of SAW is comparatively great as shown in FIG. 13(*b*).

In addition, there is also a configuration in which V22 is caused to act on the calculating section 16. In this case, while a fluctuation generated by V22 can be applied to a reference voltage and a calculation output which are to be used in the calculating section, the complexity of a structure and the number of components are to be prevented from being increased in an actual circuit design.

In order to intentionally change the control power and current by the fluctuation generating means 19, it is necessary to be careful not to adversely affect the control to turn ON the discharge lamp.

More specifically, the lower limit value of the frequency of a fluctuation (a change frequency of V22) is determined by the control power and a change in the power directly appears as a change in the amount of light of the discharge lamp. Therefore, the lower limit value is to be defined as a frequency value corresponding to the purpose of use of the discharge lamp. For example, in the use of interpersonal illumination (a lighting tool for a vehicle), approximately 30 Hz is preferable in consideration of an influence on human sight (flicker). Moreover, when the frequency of the fluctuation is unnecessarily increased, the effect of suppressing a beat noise is reduced and harmonics are generated due to the frequency itself and are apt to enter a radio frequency band (a receiver is influenced). For this reason, approximately 1 kHz may be used as an upper limit value. Accordingly, a range of 30 to 1000 Hz is practical as the frequency range of the output current or power related to the discharge lamp, although other ranges may be employed.

Moreover, the lower limit value of the amplitude of a fluctuation (a change range of V22) is to be defined as a value with which the effect of the fluctuation can be sufficiently obtained, and the upper limit value thereof is to be defined with such a range as not to generate a situation in which the lighting state of the discharge lamp cannot be maintained due to a change and reduction in the output power. Practically, the output current or power related to the discharge lamp is to be changed to be higher and lower within a range of 5% to 30% around a rated current value or a rated power value. For example, in the case in which a set range of −5% to +5% is defined in a discharge lamp having a rated power of 35W, a fluctuation is caused within a range of 33.25 to 36.75W. In the case in which a set range of −30% to 10% is defined, moreover, a fluctuation is caused within a range of 24.5 to 38.5W (24.5W approximates to a threshold power at which lighting can be maintained).

Alternatively, in the case in which the switching frequency is high, the fluctuation range of a power is necessarily increased even if the lower limit value is smaller than 5%. Consequently, the effect of suppressing a noise can be obtained. For example, it is preferable that the change range related to the switching frequency should be set to 10 kHz or more (including a change of ±5 kHz or more for a reference frequency).

By applying the structure described above to a discharge lamp lighting circuit such as a lighting tool for a car, for example, it is possible to suppress a beat noise. In addition, the suppression of the beat noise and a reduction in a power loss can be caused to be compatible with each other. Consequently, it is possible to contribute to a reduction in the size of a device.

As is apparent from the foregoing, according to the first aspect of the invention, it is possible to change a switching frequency to suppress a beat noise by applying a fluctuation in the control of an output current or power related to the discharge lamp. In addition, control is carried out such that the switching element may always be turned ON when energy stored in the transformer constituting the DC-AC converting circuit is completely output from the secondary winding. Consequently, a power loss can be reduced when the switching element is turned ON, and the efficiency of the circuit can be prevented from being deteriorated. Thus, the invention is effective for a reduction in the size of the circuit device and power saving.

According to the second aspect of the invention, it is possible to sufficiently obtain the effect of reducing a beat noise within such a range that a change in the amount of light of the discharge lamp and a radio frequency band are not influenced.

According to the third aspect of the invention, it is possible to sufficiently obtain the effect of reducing a beat noise within such a range that the lighting state of the discharge lamp can be maintained.

According to the fourth aspect of the invention, also in the case in which the range of the application of a fluctuation to the output current or power related to the discharge lamp is comparatively small, it is possible to sufficiently obtain the effect of reducing a beat noise by setting the fluctuation range of the switching frequency to 10 kilohertz or more.

What is claimed is:

1. A discharge lamp lighting circuit comprising:
   a DC—DC converting circuit operable to convert a voltage input from a DC power source into a predetermined DC voltage;
   a DC-AC converting circuit provided in a latter stage of the circuit: and
   a control circuit operable to turn ON a discharge lamp,
   wherein the DC—DC converting circuit includes a switching element to be connected to a transformer and a primary winding thereof, and control is carried out in such a manner that the transformer stores energy while the switching element is set in an ON state in response to a signal sent from the control circuit, the energy is output from a secondary winding of the transformer while the switching element is set in an OFF state in response to a signal sent from the control circuit, and the switching element is turned ON when the energy is completely output from the secondary winding in a stable lighting state of the discharge lamp,
   an output current or power related to the discharge lamp is controlled for an ON period of the switching element in response to a signal sent from the control circuit, and
   fluctuation generating means for applying a fluctuation to the control of the output current or power is provided.

2. The discharge lamp lighting circuit according to claim 1, wherein the output current or power related to the discharge lamp is changed within a range of about 30 to 1000 hertz by the fluctuation generating means provided for the control circuit.

3. The discharge lamp lighting circuit according to claim 1, wherein the output current or power related to the discharge lamp is changed to be higher or lower within a range of about 5 to 30% around a rated current value or a rated power value.

4. The discharge lamp lighting circuit according to claim 1, wherein a switching frequency related to the switching element has a fluctuation range of about 10 kilohertz or more.

5. The discharge lamp lighting circuit according to claim 1, wherein the fluctuation generating means increases and decreases said output current or power so as to generate said fluctuation.

6. The discharge lamp lighting circuit according to claim 1, wherein the fluctuation generating means increases and decreases said output current or power so as to generate said fluctuation and change switching frequency.

7. The discharge lamp lighting circuit according to claim 1, wherein said fluctuation is applied in stable lighting state of the discharge lamp.

* * * * *